United States Patent Office 3,099,667
Patented July 30, 1963

3,099,667
ORGANO GROUP IV–A METAL MANGANESE CARBONYL LIGAND COMPOUNDS AND PROCESSES FOR SAME
Richard D. Gorsich, Baton Rouge, La., assignor to Ethyl Corporation, New York, N.Y., a corporation of Virginia
No Drawing. Filed Mar. 29, 1961, Ser. No. 99,066
18 Claims. (Cl. 260—429)

This invention relates to novel and useful bimetallic compounds, specifically, organo- and halo-manganese carbonyl ligand compounds of metals of group IV–A of the periodic system of the elements and to a novel method for the preparation of such compounds.

Heretofore, certain organic and inorganic metal carbonyls have been suggested as gasoline additives, primarily for the purpose of increasing the antiknock ratings of the gasolines. For example, manganese pentacarbonyl is a highly effective antiknock agent both when used as the sole antiknock agent and when used in combination with alkyllead antiknock compounds, e.g., tetraethyllead. Effective as many of these carbonyl compounds may be, however, they all exhibit certain shortcomings in use which materially decrease their value for the stated purpose. For example, their use is generally associated with more or less severe engine wear and with a shortened useful life of the exhaust valves. It is a specific and valuable property of the compounds of this invention that they minimize these particular problems; as a result of their unusual chemical structure they do have good antiknock properties and yet they do not have the above substantial adverse effects of markedly increasing engine wear and impairing exhaust valve durability.

Accordingly, it is an object of this invention to provide new and useful organo- and halo-manganese carbonyl ligand compounds of metals of group IV–A of the periodic system of the elements. Another objec its to provide novel and effective methods for the preparation of such compounds. A further object is to provide compounds which exhibit the good antiknock effectiveness of manganese carbonyls but which are free from the marked disadvantages of shortened valve life and high engine wear associated with the use of prior metallic carbonyls in general. Other important objects of this invention will become apparent hereinafter.

The novel and useful compositions of this invention are bimetallic compounds of the general formula

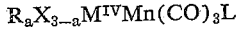

In this formula R represents a hydrocarbon or oxyhydrocarbon group; the hydrocarbon portions of these groups (which may be alike or different) are preferably alkyl, alkenyl, aryl, cycloalkyl, aralkyl or alkaryl radicals containing up to about 18 carbon atoms; X is a halogen atom; $M^{IV}$ is an element of group IV–A of the periodic system having an atomic number from 14 to 82, inclusive, i.e., silicon, germanium, tin or lead; L is a molecular ligand consisting of a cyclic or non-cyclic conjugated diene which may contain hydrocarbon or functional substituents; and $a$ is an integer from 0 to 3, inclusive. Of these compounds, those wherein X represents chlorine or bromine, those wherein $M^{IV}$ represents tin or lead, those wherein R represents phenyl and those wherein L represents a cyclic dienone are preferred because of the ready availability, economy and ease of handling of the raw materials used directly or indirectly in their synthesis and because of their relatively great solubilities in hydrocarbon and halohydrocarbon solvents, which properties contribute markedly to their utilities as antiknock agents and as chemical intermediates.

Triphenyltin manganese tricarbonyl tetraaryl cyclopentadienones, particularly triphenyltin manganese tricarbonyl tetraphenyl cyclopentadienone, are especially preferred for the reasons noted above and because of their relative ease of preparation.

The compounds of this invention are, in general, solids which melt at moderate temperatures, are stable at ordinary temperatures and can readily be prepared and stored without special precautions for future use. They are white or yellow in color and are distinctly crystalline in habit. These compounds, in general, are soluble in organic solvents such as hydrocarbons, e.g., n-hexane and benzene, and in ethers, especially cyclic ethers such as tetrahydrofuran. Certain of the compounds are sufficiently soluble in ethanol-benzene mixtures and in methylene dichloridehexane mixtures to permit fractional crystallization therefrom.

The novel compounds of this invention are of considerable value in the chemical and allied arts. For example, they are potent antiknock agents and in this utility they are versatile agents in that they are highly effective in both unleaded and conventional leaded gasolines made from a wide variety of base stocks. An additional feature of the present compounds is that when they are used as antiknock agents, the engine wear and exhaust valve durability characteristics of the engine are not markedly impaired, which is the situation brought about by the use of metallic carbonyls heretofore known.

The compounds of this invention are prepared by a carbonyl replacement process wherein a conjugated diene ligand is reacted with an organo group IV–A manganese pentacarbonyl compound. The organo group IV–A metal manganese pentacarbonyl reactant is represented by the general formula

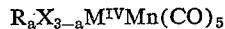

In this formula R represents a hydrocarbon or oxy-hydrocarbon group, the hydrocarbon portions of which may be alike or different and are, preferably, alkyl, alkenyl, aryl, cycloalkyl, aralkyl or alkaryl radicals containing up to about 18 carbon atoms; X is a halogen atom, e.g., chlorine, bromine or iodine; $M^{IV}$ is silicon, germanium, tin or lead; and $a$ is an integer from 0 to 3. In this process, two of the carbonyl groups are replaced by a conjugated diene ligand. Of these ligands, tetraphenyl cyclopentadienone is preferred because of its stability and accessibility and because of the stability and ease of preparation of the resulting complexes.

Illustrative of the carbonyl reactants are triphenyllead manganese pentacarbonyl, diphenylchlorolead manganese pentacarbonyl, ethyl dichlorotin manganese pentacarbonyl, dibenzylbromogermanium manganese pentacarbonyl, dimethylethyltin manganese pentacarbonyl, tridodecylsilicon manganese pentacarbonyl, tricumenylgermanium manganese pentacarbonyl, tribenzyllead manganese pentacarbonyl, trimesityltin manganese pentacarbonyl, divinylethylsilicon manganese pentacarbonyl, tri-p-tolylgermanium manganese pentacarbonyl, triethoxytin manganese pentacarbonyl and triphenoxygermanium manganese pentacarbonyl. Of these reactants, the triaryltin manganese pentacarbonyl compounds, especially triphenyltin manganese pentacarbonyl, are preferred because of their ease of separation and because of their solubility in organic solvents, which markedly facilitates their purification.

Illustrative of the ligand reactants are butadiene; isoprene; pentadiene; 2,3-dimethylbutadiene; 2-methyl-3-ethylbutadiene; 2-butylcyclohexadiene; 1,3-dimethylcyclooctatetraene; cyclopentadiene; cycloheptatriene; tetramethylcyclopentadienone; 2,3-diphenylcyclopentadienone; 2,5-diethylcyclopentadienone; tetraphenylcyclopentadienone and the like. Thus, in general, such conjugated dienes are either acyclic or cyclic, preferably having up to and including about 35 carbon atoms. Of these ligand reactants, the cyclic conjugated dienes, particularly cyclobutadiene, cyclopentadiene and tetraphenylcyclopentadienone, are especially preferred because of their ease of preparation and because of their solubility in organic solvents, which markedly facilitates their purification.

The process of the invention is carried out by bringing the reactions together in the presence or absence of a solvent generally, but not necessarily, at an elevated temperature. Preferably, the reactants are fused together at a temperature in the range of 100–350° C. Temperatures in the range of 175–250° C. are preferred because under these conditions the reaction proceeds at a satisfactory rate, the reactants and products exhibit adequate stability and these temperatures are within the liquid range of the selected high-boiling solvents, if such are used. Typical of the high-boiling solvents which can be used are the following: tetrahydronaphthalene, decahydronaphthalene, o-xylene, m-xylene, p-xylene, benzyl butyl ether, benzyl ethyl ether, butyl phenyl ether, butyl-o-tolyl ether, butyl-m-tolyl ether, butyl-p-tolyl ether, heptyl phenyl ether and bis(p-chlorophenyl)ether.

The reaction is normally carried out at atmospheric pressure but elevated pressure can be used if it is desired to use lower boiling solvents and is recommended for the more volatile reactants. Typical of the lower boiling solvents which can be used are the following: toluene, ethyl benzene, chlorobenzene, ethyl amyl ether, ethyl isoamyl ether, β-chloroethyl ether, β-bromoethyl ether and bis(chloromethyl)ether.

It is preferred to use the reactants in essentially stoichiometric proportions of one mole of the conjugated diene ligand per mole of the organo group IV–A manganese pentacarbonyl because problems of separation and recovery are avoided thereby, at least in part, but an excess of one reactant or the other may be used if desired to drive the reaction toward completion.

The foregoing reaction proceeds smoothly under the prescribed conditions, reaching completion for the phenyl derivatives in 2–6 hours. Somewhat shorter reaction times are satisfactory for the lower alkyl derivatives and somewhat longer ones are desirable for the more highly substituted aryl derivatives and for those derivatives containing highly substituted ligands. In any event, reaction periods up to about 10 hours are quite adequate for good yields.

The carbonyl reactants can readily be prepared by the reaction of an alkali metal manganese pentacarbonyl with an organometallic halide of a metal of group IV–A of the periodic system, i.e., silicone, germanium, tin or lead, in inert organic solvent such as tetrahydrofuran. This reaction occurs rapidly when the components are stirred together in tetrahydrofuran solution at room temperature.

The invention will be more fully understood by reference to the following illustrative examples in which all parts and percentages are by weight.

*Example I*

A mixture of 5.0 grams (0.009 mole) of triphenyltin manganese pentacarbonyl and 3.5 grams (0.009 mole) of tetraphenylcyclopentadienone was heated between 180 and 194° C. for 4 hours while maintaining a nitrogen atmosphere. Subsequently the reaction mass was extracted several times with refluxing n-hexane. The combined extracts were concentrated until yellow crystals began to separate. The mixture was cooled to room temperature and the product was filtered off to give 2.43 grams (31%) of triphenyltin manganese tricarbonyl tetraphenylcyclopentadienone, melting at 198–203° C. Recrystallization from methylene chloride and n-hexane raised the melting point to 205–207° C.

*Example II*

27 parts of trimethylsilicon manganese pentacarbonyl is placed in a bomb and 5.4 parts of butadiene is introduced, after which the bomb is sealed. The bomb is then heated to 158–170° C. for a period of 3 hours. After the bomb is cooled and vented, trimethylsilicon manganese tricarbonyl butadiene is obtained.

*Example III*

To 32 parts of triethylgermanium manganese pentacarbonyl, 7.2 parts of 1,3-cyclohexadiene is added and the mixture is heated under pressure to 175–193° C. and is maintained at this temperature for 3½ hours. The product is triethylgermanium manganese tricarbonyl cyclohexadiene.

*Example IV*

48.5 parts of tributyltin manganese pentacarbonyl is added to 10.8 parts of 1,3-cyclooctadiene. Reaction for 10 hours at 100–110° C. results in the formation of tributyltin manganese tricarbonyl cyclooctadiene.

*Example V*

When 74 parts of trioctyllead manganese pentacarbonyl is mixed with 6.8 parts of 1,3-pentadiene and the mixture is heated under pressure at 185–200° C. for a period of 3 hours, trioctyllead manganese tricarbonyl 1,3-pentadiene is obtained.

*Example VI*

Tetralin solutions of 90 parts of tricetylsilicon manganese pentacarbonyl and 6.8 parts of isoprene are mixed and the mixture is dissolved in 100 parts of tetralin. The solution is heated under pressure for 3 hours. The product is tricetylsilicon manganese tricarbonyl isoprene.

*Example VII*

When 63 parts of tris(2,4-xylyl)tin manganese pentacarbonyl and 8.8 parts of cyclopentadienone are mixed and the mixture is heated for 4 hours at 195–210° C., tris(2,4-xylyl)tin manganese tricarbonyl cyclopentadienone is obtained.

*Example VIII*

A mixture of trimesityllead manganese pentacarbonyl (76 parts) and tetraphenylcyclopentadienone (38.4 parts) is heated at 200–212° C. for a period of 5 hours. The product is trimesityllead manganese tricarbonyl tetraphenylcyclopentadienone.

*Example IX*

49.6 parts of tribenzylsilicon manganese pentacarbonyl is dissolved in 500 parts of heptylphenyl ether and 5.4 parts of butadiene is introduced into the solution. The resulting mixture is heated under pressure at 185–190° C. for 3 hours. Tribenzylsilicon manganese tricarbonyl butadiene is thus obtained.

*Example X*

A mixture of 58.3 parts of triphenethylgermanium manganese pentacarbonyl and 8.0 parts of 1,3-cyclohexadiene is heated at 190–205° C. for a period of 3½ hours. The product is triphenethylgermanium manganese tricarbonyl cyclohexadiene.

*Example XI*

39.5 parts of trivinyltin manganese pentacarbonyl is treated with 10.8 parts of 1,3-cyclooctadiene. Reaction for 3½ hours at 185–196° C. results in the formation of trivinyltin manganese tricarbonyl cyclooctadiene.

*Example XII*

To 52.5 parts of triallyllead manganese pentacarbonyl, 6.8 parts of 1,3-pentadiene is added and the mixture is heated at 175–182° C. for a period of 3½ hours. The product is triallyllead manganese tricarbonyl 1,3-pentadiene.

*Example XIII*

When 50.2 parts of diphenylbromogermanium manganese pentacarbonyl and 6.8 parts of isoprene are mixed and heated under pressure for a period of 3 hours at 185–

193° C., diphenylbromogermanium manganese tricarbonyl isoprene is obtained.

Example XIV

To 30.9 parts of methyldichlorosilicon manganese pentacarbonyl, 6.6 parts of cyclopentadiene is added. The mixture is heated to 178–186° C. and is maintained at that temperature for 3½ hours. The product is methyldichlorosilicon manganese tricarbonyl cyclopentadiene.

Example XV

Triethoxytin manganese pentacarbonyl (44.9 parts) and cyclopentadienone (8.0 parts) are heated together for 4 hours at 212° C. Triethoxytin manganese tricarbonyl cyclopentadienone is obtained.

Example XVI

A mixture of 62.2 parts of tributoxylead manganese pentacarbonyl and 38.4 parts of tetraphenylcyclopentadienone is heated for 4 hours at 187–201° C. The product is tributoxylead manganese tricarbonyl tetraphenyl cyclopentadienone.

Example XVII

When 42 parts of trichlorotin manganese pentacarbonyl is mixed with 6.8 parts of 1,3-pentadiene and the mixture is heated under pressure at 178–190° C. for 2 hours, trichlorotin manganese tricarbonyl 1,3-pentadiene is obtained.

The above examples have been presented by way of illustration and it is not intended to limit the scope of the invention thereby. Employing the procedures illustrated therein and the process of this invention, other novel products are produced by appropriate substitution of the organo metal manganese pentacarbonyl and ligand reactants described hereinbefore. Thus, employing the process of this invention, the following novel products are also produced: triphenoxysilicon manganese tricarbonyl tetraphenylcyclopentadienone by reaction of triphenoxysilicon manganese pentacarbonyl with tetraphenylcyclopentadienone; tripropylgermanium manganese tricarbonyl butadiene from tripropylgermanium manganese pentacarbonyl and butadiene; diethylmethyltin manganese tricarbonyl cyclohexadiene by reaction of equimolar amounts of diethylmethyltin manganese pentacarbonyl and cyclohexadiene; triisobutoxylead manganese tricarbonyl cyclooctatetraene from triisobutoxylead manganese pentacarbonyl and cyclooctatetraene; and trineopentylsilicon manganese tricarbonyl 1,3-pentadiene by reaction of trineopentylsilicon manganese pentacarbonyl with 1,3-pentadiene. By similar procedures, the following new compounds are produced from the appropriate components: tridecylgermanium manganese tricarbonyl isoprene; tris-m-tolyllead manganese tricarbonyl cyclopentadienone, tris-m-cumenylsilicon manganese tricarbonyl 2,3-dimethylbutadiene, tricetylgermanium manganese tricarbonyl tetramethylcyclopentadienone, tricyclopentadienyltin manganese tricarbonyl 2,5-dimethylcyclopentadienone, tris(methylcyclopentadienyl)lead manganese tricarbonyl tetraphenylcyclopentadienone, tricyclohexoxysilicon manganese tricarbonylbutadiene, tribenzylgermanium manganese tricarbonyl cyclohexadiene, triphenethyllead manganese tricarbonylcyclooctatetraene, trimesityltin manganese tricarbonylisoprene, tris-2-indenylgermanium manganese tricarbonylcyclopentadienone and tris-2-fluorenyltin manganese tricarbonyltetramethylcyclopentadienone.

In carrying out the reactions of this invention, the reactants are normally combined as indicated above in approximately stoichiometric proportions but the proportions employed can vary from a 100% or greater excess by weight of the carbonyl reactant to a 100% or greater excess of the ligand reactant. A slight excess of one reactant or the other, as about 10% by weight, is often used to bring about an increased reaction rate.

As indicated above, the reactions of this invention are usually carried out by fusing the components together in the absence of any solvent. Where solvents are employed, however, they may include essentially inert hydrocarbons such as the xylenes, tetrahydronaphthalene, decahydronaphthalene, cumene, durene, isodurene, and 9,10-dihydroanthracene and the like, halohydrocarbons such as α-chloronaphthalene and β-chloronaphthalene and the like and ethers such as benzyl ethyl ether, benzyl butyl ether, butyl phenyl ether, butyl-o-tolyl ether, butyl-m-tolyl ether, butyl-p-tolyl ether, heptyl phenyl ether and bis(p-chlorophenyl)ether and the like. The solvent of choice is tetrahydronaphthalene because of its high boiling point, its relatively high solubility for the reactants (the latter being of particular value in that it facilitates the separation of the solvent and recovery of the product) and its accessibility and ease of preparation.

The reaction of this invention may be carried out at any temperature and pressure in the absence of solvents within the liquid range of the lower melting reactant but below the decomposition temperature of the reactants or products. When solvents for at least one of the reagents are employed, the reaction temperature is subject to considerable latitude, as from about room temperature and lower up to the decomposition temperature of the reactants or products. Ordinarily, temperatures between about 100 and 250° C. are employed for the best results both in the presence and absence of a solvent. Generally, the exposure of the reactants to ultraviolet radiation enhances the reaction and lower temperatures can be employed so that in such cases best results are obtained at temperatures between about 50 and 175° C.

Because the reactions ordinarily proceed at satisfactory rates under normal pressure conditions, atmospheric pressure is usually satisfactory but pressures ranging from 10 millimeters of mercury to 100 atmospheres may be used if desired provided a liquid reaction system is maintained at least in part.

The reactions of this invention may be carried out under any atmosphere inert to the reactants and products. The compounds are stable on exposure, at reaction temperature, to dry nitrogen which can thus be used with safety. Other suitable protective atmospheres include dry helium, neon, argon, krypton and xenon.

The normally solid compounds of this invention are soluble in and can be purified by recrystallization from a variety of organic solvents. Specifically, simple aromatic solvents such as benzene or toluene, simple aliphatic solvents such as hexane, alcohols such as ethanol, and halohydrocarbons such as methylene chloride and carbon tetrachloride and their mixtures are found to be satisfactory.

As stated above, the compounds of this invention are useful as antiknock agents for internal combustion engine fuels. They may suitably be employed in concentrations varying from that corresponding to about 0.005 gram of manganese per gallon to their saturation concentrations at ambient temperature. They are highly effective agents and their versatility is shown by the fact that they can be added to the fuel either alone or in combination with other antiknock agents such as tetraethyllead. For example, the addition of 0.01 gram of manganese per gallon as triphenyllead manganese tricarbonyl tetraphenylcyclopentadienone to a catalytically cracked gasoline increases the octane number thereof. Similar such enhancement in the octane number of fuels is obtained employing other novel products of this invention.

Furthermore, since the bimetallic compounds of this invention are relatively unstable at temperatures greatly exceeding the temperatures of their formation, they can be used to plate an alloy of the component metals on a suitable substrate by contacting the heated substrate with the appropriate compound. The tin compounds of this invention are excellent thermal stabilizers for polyvinyl chloride and the like.

I claim:
1. A compound represented by the general formula

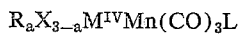

wherein $M^{IV}$ is an element selected from the group consisting of the elements of group IV–A of the periodic system of the elements having atomic numbers from 14 to 82, inclusive, L is a conjugated diene molecular ligand selected from the group consisting of conjugated acyclic diene hydrocarbons containing from 4 to about 6 carbon atoms, of conjugated cyclic diene hydrocarbons containing from 5 to about 8 carbon atoms and of cyclic dienones containing from 4 to about 35 carbon atoms, R is a radical selected from the group consisting of hydrocarbon and oxyhydrocarbon radicals containing up to about 18 carbon atoms, X is a halogen, and $a$ is an integer from 0 to 3, inclusive.

2. The compound of claim 1 wherein L is a conjugated acyclic diene hydrocarbon containing from 4 to about 6 carbon atoms.

3. Triphenyltin manganese tricarbonyltetraphenylcyclopentadienone.

4. Trimethylsilicon manganese tricarbonyl butadiene.

5. The compound of claim 1 wherein L is a conjugated cyclic diene hydrocarbon containing from 5 to about 8 carbon atoms.

6. Tribenzylgermanium manganese tricarbonyl cyclohexadiene.

7. Triisobutoxylead manganese tricarbonyl cyclooctatetraene.

8. The compound of claim 1 wherein L is a cyclic dienone containing from 4 to about 35 carbon atoms.

9. The method of preparing the compound of claim 1 which comprises reacting a compound represented by the general formula

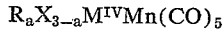

wherein $M^{IV}$ is an element selected from the group consisting of the elements of group IV–A of the periodic system of the elements having atomic numbers from 14 to 82, inclusive, R is a radical selected from the group consisting of hydrocarbon and oxyhydrocarbon radicals containing up to about 18 carbon atoms, X is a halogen, and $a$ is an integer from 0 to 3, inclusive, with a conjugated diene molecular ligand selected from the group consisting of conjugated acyclic diene hydrocarbons containing from 4 to about 6 carbon atoms, of conjugated cyclic diene hydrocarbons containing from 5 to about 8 carbon atoms and of cyclic dienones containing from 4 to about 35 carbon atoms.

10. The method of claim 9 wherein the said ligand is a conjugated acyclic diene hydrocarbon containing from 4 to about 6 carbon atoms.

11. The method of claim 9 wherein the said ligand is butadiene.

12. The method of claim 9 wherein the said ligand is butadiene and the said compound is trimethylsilicon manganese pentacarbonyl.

13. The method of claim 9 wherein the said ligand is a conjugated cyclic diene hydrocarbon containing from 5 to about 8 carbon atoms.

14. The method of claim 9 wherein the said ligand is cyclohexadiene.

15. The method of claim 9 wherein the said ligand is cyclohexadiene and the said compound is tribenzylgermanium manganese pentacarbonyl.

16. The method of claim 9 wherein the said ligand is a cyclic dienone containing from 4 to about 35 carbon atoms.

17. The method of claim 9 wherein the said ligand is tetraphenylcyclopentadienone.

18. The method of claim 9 wherein the said ligand is tetraphenylcyclopentadienone and the said compound is triphenyltin manganese pentacarbonyl.

References Cited in the file of this patent
UNITED STATES PATENTS
2,916,503    Kozikowski _____ Dec. 8, 1959